United States Patent [19]

Loch et al.

[11] Patent Number: 4,730,011

[45] Date of Patent: Mar. 8, 1988

[54] SYNTHETIC RESIN CONTAINING QUATERNARY AMMONIUM GROUPS, ITS PREPARATION, AND PIGMENT PASTE PRODUCED USING THIS RESIN

[75] Inventors: Werner Loch, Erpolzheim; Rolf Osterloh, Gruenstadt; Eberhard Schupp, Schwetzingen; Klaas Ahlers, Muenster, all of Fed. Rep. of Germany

[73] Assignee: BASF Aktiengesellschaft, Ludwigshafen, Fed. Rep. of Germany

[21] Appl. No.: 765,495

[22] Filed: Aug. 15, 1985

[30] Foreign Application Priority Data

Aug. 28, 1984 [DE] Fed. Rep. of Germany ....... 3431532

[51] Int. Cl.[4] .............................................. C08L 63/00
[52] U.S. Cl. .................................. 523/414; 523/416; 528/87
[58] Field of Search ................... 523/414, 416; 528/87

[56] References Cited

U.S. PATENT DOCUMENTS 3,936,405 2/1976 Sturni et al. ........................ 523/414

Primary Examiner—John Kight
Assistant Examiner—M. L. Moore
Attorney, Agent, or Firm—Keil & Weinkauf

[57] ABSTRACT

A synthetic resin which contains quaternary ammonium groups, and its preparation.

The water-dilutable synthetic resin which contains quaternary ammonium groups and furthermore contains one or more basic secondary and/or tertiary amino groups per quaternary ammonium group is an adduct of (A) a quaternary ammonium salt which is obtained by reacting
   (a) an organic compound containing two or more basic amino groups per molecule, one of which is a primary group and is protected as a ketimine by prior reaction with a ketone, and the remaining groups are tertiary groups, with
   (b) an organic or inorganic acid and
   (c) a monoepoxide compound, and, if necessary, then eliminating the ketone hydrolytically, (B) a resin which contains on average from 1.5 to 3.0 epoxide groups per molecule, and, if required, (C) one or more monofunctional organic compounds whose functional group is capable of undergoing an addition reaction with an epoxide.

This synthetic resin is suitable as a binder and a grinding resin for cathodic electrocoating.

6 Claims, No Drawings

SYNTHETIC RESIN CONTAINING QUATERNARY AMMONIUM GROUPS, ITS PREPARATION, AND PIGMENT PASTE PRODUCED USING THIS RESIN

The present invention relates to a water-dilutable synthetic resin containing quaternary ammonium groups, a process for its preparation, cathodic electrocoating binders prepared from this resin, and in particular the preparation of pigment pastes for pigmenting cathodic electrocoating finishes.

The preparation of quaternary ammonium salts by reacting a tertiary amine salt with a monoepoxide has long been known [cf. Houben-Weyl, Methoden der organischen Chemie, Volume XI/2, 4th edition, pages 610–611 (1958)]. In U.S. Pat. No. 3,925,180, this reaction is utilized for the preparation of a pigment dispersant consisting of a reaction product of an aliphatic glycidyl ether or ester with a secondary or tertiary amine salt. The resulting quaternary ammonium salt has a low molecular weight. The pigment-carrying capacity of such low molecular weight assistants is known to be low.

Relatively high molecular weight resins which are suitable for the preparation of stable aqueous pigment pastes are described in U.S. Pat. No. 3,936,405. Here, epoxy resins, preferably those based on polyglycidyl ethers of polyphenols, are converted to resins containing quaternary ammonium groups by reaction with, inter alia, tertiary amine salts. Resins which contain not only quaternary ammonium groups but also basic secondary amino groups, which constitute useful additional crosslinking points and improve the pigment-dispersing power of such resins, cannot be obtained in this manner since the amine salts employed have to be monofunctional so that undesirable side reactions or even gelling are avoided. This also applies to the binders or pastes which are described in U.S. Pat. Nos. 3,962,165 and 4,035,275 and are obtained in a similar manner.

In U.S. Pat. No. 4,069,210, a polyepoxide is reacted with a polyamine which contains two or more tertiary amino groups in salt form to give an internally ionized resin containing quaternary ammonium groups, these groups being arranged along the chain. Resins which contain not only quaternary ammonium groups but also basic secondary amino groups are also unobtainable by this route.

Finally, U.S. Pat. No. 4,071,428 describes aqueous dispersions of binders which contain quaternary ammonium groups and are obtained by reacting polymeric tertiary amines with monoepoxides.

This method, too, does not permit the preparation of resins which, in addition to quaternary ammonium groups, also contain crosslinkable basic secondary amino groups.

It is an object of the present invention to provide a synthetic resin having increased crosslinkability and basicity as well as an improved pigment-carrying capacity.

We have found that synthetic resins which contain not only quaternary ammonium groups but also basic secondary amino groups can be prepared if a preprepared low molecular weight quaternary ammonium salt which still contains a free or ketimine-protected primary amino group is subjected to an addition reaction with an epoxy resin.

The present invention relates to a water-dilutable synthetic resin containing quaternary ammonium groups which furthermore contains one or more basic secondary or tertiary amino groups or secondary and tertiary amino groups per quaterary ammonium group and is an adduct of (A) a quaternary ammonium salt having a molecular weight of about 175–1200, which is prepared by reacting
  (a) an organic compound possessing two or more basic amino groups per molecule, one of which is a primary group and is protected as a ketimine by prior reaction with a ketone, and the remaining basic amino groups are tertiary groups with
  (b) from 15 to 100 mol %, based on the nitrogen atoms of component (a), of an organic or inorganic acid and
  (c) from 15 to 100 mol %, based on the nitrogen atoms of component (a), of one or more monoepoxide compounds, and, if required, eliminating the protective group hydrolytically, and
(B) a resin which has a mean molecular weight $\overline{M}_w$ of from 300 to 6000 and contains on average from 1.5 to 3.0 epoxide groups per molecule, and, if necessary,
(C) one or more monofunctional organic compounds whose functional group is capable of undergoing an addition reaction with an epoxide, with the exception of tertiary amines and their salts.

The present invention furthermore relates to a process for the preparation of such a water-dilutable synthetic resin containing quaternary ammonium groups, wherein (A) a quaternary ammonium salt having a molecular weight of about 175–1200 is prepared by neutralizing
  (a) an organic compound containing two or more basic amino groups per molecule, one of which is a primary group and is protected as a ketimine by prior reaction with a ketone, and the remaining basic amino groups are tertiary groups, in the presence or absence of an inert organic solvent, with
  (b) from 15 to 100 mol %, based on the nitrogen atoms of component (a), of an organic or inorganic acid, reacting the product with
  (c) from 15 to 100 mol %, based on the nitrogen atoms of component (a), of one or more monoepoxide compounds
at from 50° to 100° C., and, if required, then eliminating the protective group hydrolytically, and is reacted with
(B) from 1 to 4 equivalents, per protected or unblocked primary amino group of component (A), of a resin which has a mean molecular weight $\overline{M}_w$ of from 300 to 6000 and contains on average from 1.5 to 3.0 epoxide groups per molecule, at from 30° to 130° C., until the epoxide value has decreased by the theoretically expected amount, and any remaining epoxide groups are reacted with
(C) an equivalent amount of one or more monofunctional organic compounds whose functional group is capable of undergoing an addition reaction with an epoxide, with the exception of tertiary amines and their salts, until virtually no more epoxide is detectable, and the reaction of the quaternary ammonium salt (A) with components (B) and (C) may also be carried out in one stage.

Component (a) is preferably a ketimine-protected primary/tertiary diamine of the general formula (I),

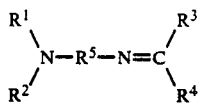

(1)

where R$^1$ and R$^2$ may be identical or different and are each straight-chain or branched alkyl of 1 to 4 carbon atoms, R$^3$ and R$^4$ may be identical or different and are each straight-chain or branched alkyl of 1 to 8 carbon atoms, or the carbon atom bonded to R$^3$ and R$^4$ forms part of a 5-membered to 7-membered carbocyclic ring, and R$^5$ may be straight-chain or branched and is a divalent aliphatic or cycloaliphatic radical which may or may not contain heteroatoms, such as nitrogen, oxygen or sulfur.

The present invention furthermore relates to a process for the preparation of binders for cathodic electrocoating finishes, in particular grinding resins for the preparation of stable aqueous pigment pastes for pigmenting the said finishes, wherein the synthetic resin according to the invention is employed.

The present invention furthermore relates to a pigment paste which consists of (α) from 5 to 50% by weight of the synthetic resin according to the invention, (β) from 20 to 65% by weight of organic and/or inorganic pigments and/or fillers, (γ) from 2 to 20% by weight of organic solvents conventionally used in cathodic electrocoating, and (δ) from 28 to 55% by weight of water, with the proviso that the sum of the percentages stated under (α) to (δ) is 100, with or without (ε) not more than 5% by weight, based on the sum of the components (α) to (δ), of assistants and/or curing catalysts conventionally used in surface coating technology.

The present invention furthermore relates to a cathodic electrocoating finish which contains from 2 to 45% by weight of a pigment paste according to the invention.

Regarding the components of the novel synthetic resin, the following may be stated specifically:

(A) Component (A) is a quaternary ammonium salt which has a molecular weight of about 175–1200, preferably from 175 to 1000, in particular from 175 to 500, and is obtained by reacting (a) an organic compound which contains two or more basic amino groups per molecule, one of which is a primary group and is protected as a ketimine by prior reaction with an aliphatic or cycloaliphatic ketone, and the remaining basic amino groups are tertiary groups, with (b) from 15 to 100 mol %, based on the nitrogen atoms of component (a), of an organic or inorganic acid and (c) from 15 to 100 mol %, based on the nitrogen atoms of component (a), of one or more monoepoxide compounds, for example a monoepoxide compound from the series consisting of alkene oxides, glycidyl ethers, glycidyl esters and other glycidyl compounds, and, if required, then eliminating the ketone hydrolytically.

(a) Suitable components (a) are organic compounds which contain two or more basic amino groups per molecule, one of which is a primary group and is protected as a ketimine by prior reaction with a ketone, and the remaining basic amino groups are tertiary groups.

Component (a) is preferably a ketimineblocked primary/tertiary diamine of the general formula I

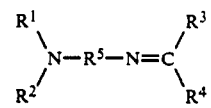

(I)

where R$^1$ and R$^2$ may be identical or different and are each straight-chain or branched alkyl of 1 to 4, preferably 1 or 2, carbon atoms, R$^3$ and R$^4$ may be identical or different and are each straight-chain or branched alkyl of 1 to 8, preferably 1 to 4, carbon atoms, or the carbon atom bonded to R$^3$ and R$^4$ forms part of a 5-membered to 7-membered, preferably 6-membered, carbocyclic ring, and R$^5$ may be straightchain or branched and is a divalent aliphatic radical of 2 to 12 carbon atoms or a cycloaliphatic radical of 5 to 15, preferably 5 to 7, carbon atoms, preferably an aliphatic radical of 2 to 6 carbon atoms, and may contain heteroatoms, such as nitrogen, oxygen or sulfur, in the chain or ring. Component (a) can be obtained in a conventional manner from a primary/tertiary diamine of the formula Ia and a ketone of the formula Ib

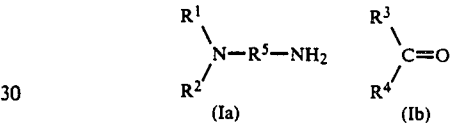

(Ia)  (Ib)

with elimination of water. R$^1$ to R$^5$ have the above meanings.

Examples of suitable primary/tertiary diamines of the formula Ia are N,N-dimethylethylenediamine, N,N-dimethylpropylene-1,3-diamine, N,N-diethylethylenediamine, N,N-diethylpropylene-1,3-diamine, N,N-diisopropylethylenediamine, N,N-dibutylethylenediamine, N,N-diethylbutylene-1,4-diamine, 1-diethylamino-4-aminopentane, dimethylaminoneopentanamine, N,N-dimethylhexamethylenediamine, 4-dimethylamino-4-aminodicyclohexylmethane, N,N-dimethyl-4,9-dioxadodecane1,12-diamine and mixtures of these compounds. Preferred primary/tertiary diamines are N,N-dimethylethylenediamine and N,N-dimethylpropylene-1,3-diamine.

Suitable ketones of the formula Ib are straight-chain and branched aliphatic and cycloaliphatic ketones, e.g. acetone, methyl ethyl ketone, methyl propyl ketone, methyl isopropyl ketone, methyl isobutyl ketone, methyl isoamyl ketone, diethyl ketone, dipropyl ketone and cyclohexanone. Particularly preferred ketones are acetone, methyl ethyl ketone, methyl isobutyl ketone and cyclohexanone.

(b) Component (b) is an organic or inorganic, preferably organic, acid, and is used in an amount of from 15 to 100, preferably from 25 to 70, in particular from 35 to 50, mol %, based on the nitrogen atoms of component (a).

Examples of suitable acids are hydrochloric acid, sulfuric acid, phosphoric acid, formic acid, acetic acid, propionic acid, lactic acid and the like. Formic acid and acetic acid are preferred.

(c) Components (c) are monoepoxide compounds and are used in amounts of from 15 to 100, preferably from 25 to 70, in particular from 35 to 50, mol %, based on the nitrogen atoms of component (a). Suitable monoepoxide compounds are alkene oxides of 2 to 18 carbon atoms, e.g. ethylene oxide, propylene oxide, butylene oxide and hexene oxide, as obtained in a conventional manner by epoxidation of the parent olefins. Other suitable monoepoxide compounds are glycidyl ethers of $C_1$–$C_{18}$-monoalkanols and monophenols, e.g. hexyl glycidyl ether, octyl glycidyl ether, 2-ethylhexyl glycidyl ether, dodecyl glycidyl ether, octadecyl glycidyl ether and phenyl glycidyl ether, and glycidyl esters of conventional $C_2$–$C_{18}$-monocarboxylic acids, e.g. glycidyl versatate, glycidyl stearate, glycidyl benzoate and glycidyl methacrylate, and other glycidyl compounds, such as glycidol and epichlorohydrin, as well as mixtures of these monoepoxide compounds. Preferred monoepoxide compounds are butylene oxide and glycidol.

The reaction of components (a), (b) and (c) to give component (A) is carried out in general at from 50° to 100° C., preferably from 70° to 80° C., in a suitable organic solvent or in the absence of a solvent, and in the absence of water. Depending on the boiling point of component (c), the reaction may be carried out in a closed apparatus under superatmospheric pressure, or under atmospheric pressure in an open apparatus provided with a reflux condenser. The reaction generally takes from 1 to 10 hours and is complete when virtually no more epoxide can be detected titrimetrically. The resulting quaternary ammonium salt (A) is reacted with component (B) either directly as the ketimine or after hydrolytic elimination of the protective group (for example at from 20° to 100° C. for from 10 to 60 minutes with a 2-fold to 10-fold excess of water). In most cases, it is not necessary to separate off excess water or the eliminated ketone before this reaction.

(B) Component (B) is a resin which has a mean molecular weight $\overline{M}_w$ of from 300 to 6000, preferably from 800 to 4000, and contains on average from 1.5 to 3.0, preferably two, epoxide groups per molecule. In the process for the preparation of the novel synthetic resin, it is used in general in an amount of from 1 to 4, preferably from 1 to 2, equivalents per protected or unblocked primary amino group of component (A). Examples of suitable resins (B) containing epoxide groups are glycidyl ethers of polyphenols which contain on average two or more phenolic hydroxyl groups per molecule and can be prepared, for example, in a conventional manner by etherification of the polyphenols with an epihalohydrin in the presence of an alkali. Examples of suitable phenol compounds (polyphenols) are 2,2-bis-(4-hydroxyphenyl)-propane, 4,4'-dihydroxybenzophenone, 1,1-bis-(4-hydroxyphenyl)ethane, 1,1-bis-(4-hydroxyphenyl)-isobutane, 2,2-bis(4-hydroxy-tert.-butylphenyl)-propane, bis-(2-hydroxy- naphthyl)-methane and 1,5-dihydroxynaphthalene. Aromatic epoxy resins having a molecular weight of from 800 to 4000 are preferably used. These may be obtained by reacting one of the diglycidyl ethers stated above with a polyphenol, e.g. 2,2-bis-(4-hydroxyphenyl)-propane, and then further reacting the resulting product with an epichlorohydrin to prepare a polyglycidyl ether, or reacting the abovementioned diglycidyl ether with less than the equivalent amount of the polyphenol. Another class of suitable epoxy resins comprises polyglycidyl ethers of phenolic novolak resins.

Other suitable components (B) are polyglycidyl ethers of polyhydric alcohols, eg. ethylene glycol, diethylene glycol, triethylene glycol, propylene glycol, propane-1,3-diol, pentane-1,5-diol, hexane-1,2,6-triol, glycerol and 2,2-bis-(4-hydroxycyclohexyl)- propane.

Further materials which contain epoxide groups and can be used as component (B) are N,N-diglycidyl derivatives of N-heterocycles and triglycidyl isocyanurate.

Polyglycidyl esters of polycarboxylic acids and copolymers of glycidyl esters of $\alpha,\beta$-ethylenically unsaturated carboxylic acids, e.g. glycidyl methacrylate, with other $\alpha,\beta$-ethylenically unsaturated compounds can also be used as component (B) in the process according to the invention.

Preferred components (B) are 2,2-bis-(4-hydroxyphenyl)-propanediglycidyl ether, and polyadducts of 2,2-bis-(4-hydroxyphenyl)-propane and its diglycidyl ether, these polyadducts containing on average two epoxide groups per molecule.

For reasons relating to resilience, it may be advantageous if the stated epoxy resins (B) are modified, before reaction with the quaternary ammonium salt (A), with less than the equivalent amount of long-chain polyfunctional alcohols or mercaptans.

Elastifying with long-chain secondary diamines, for example dimeric fatty acid bis[2-(2-hydroxyethylamino)ethyl]amide, is also possible, the said diamines likewise being used in less than the equivalent amount. In this case, the elastification and reaction with the quaternary ammonium salt (A) can be carried out simultaneously.

It is also possible to carry out elastification using long-chain primary diamines whose amino groups are protected in the form of ketimines. These compounds too are used in less than the equivalent amount, and the elastification can be carried out simultaneously with the addition reaction of the quaternary ammonium salt (A).

The reaction of the quaternary ammonium salt (A) with the material (B) containing epoxide groups is effected in general at from 30° to 130° C., preferably from 60° to 120° C., under atmospheric pressure, in a suitable solvent which cannot react with epoxides under the stated reaction conditions, or in the absence of a solvent, the reaction being carried out until the epoxide value decreases by the theoretically expected amount.

When specific ratios of components (A) and (B) are chosen, larger or smaller amounts of epoxide groups may remain. For stability reasons, however, the novel synthetic resin should be free from intact epoxide, and in this case the remaining epoxide groups are therefore reacted with a component (C).

(C) Component (C), which is used where epoxide groups of (B) remain and is employed in equivalent amounts, based on the remaining epoxide groups of (B), is any monofunctional organic compound whose functional group is capable of undergoing an addition reaction with an epoxide, with the exception of tertiary amines and their salts.

Suitable compounds are monoalcohols, monophenols, monomercapto compounds, monocarboxylic acids, secondary monoamines and ketimines of primary monoamines.

The reaction with the component (C) which may be necessary is effected under conditions similar to those for the reaction between (A) and (B) and can in most cases also be carried out simultaneously with this reaction, taking into account the residual epoxide content expected on the basis of the ratio of (A) to (B).

The synthetic resin prepared according to the invention can be used in pure solid form, but is preferably employed diluted with a solvent conventionally used in surface coating technology, the solids content being from 40 to 80, preferably from 50 to 70, % by weight. Preferred solvents are esters, e.g. ethyl acetate, butyl acetate and/or ethylglycol acetate, ketones, such as acetone, methyl ethyl ketone, methyl isobutyl ketone and or cyclohexanone, alcohols, such as ethanol, n-propanol, isopropanol, butanols, 2-ethylhexanol, isodecanol and/or benzyl alcohol, and glycol monoethers, such as methylglycol, ethylglycol, propylglycol, butylglycol, hexylglycol, phenylglycol, methoxypropanol, phenoxypropanol, methyl diglycol, ethyl diglycol and/or butyl diglycol. Water-miscible solvents, such as acetone, ethanol, isopropanol, methylglycol, ethylglycol, propylglycol, butylglycol, methoxypropanol, methyl diglycol, ethyl diglycol and butyl diglycol, are particularly preferred.

The novel synthetic resin is water-dilutable without further neutralization with an acid. The abovementioned, particularly preferred water-miscible solvents can therefore also be used in combination with water. In specific cases, it may be advantageous to use water alone as the solvent.

Because it can be diluted with water, the novel synthetic resin is particularly useful as a binder for cathodic electrocoating finishes, particularly in combination with other prior art cathodic electrocoating binders which are compatible with the synthetic resin according to the invention.

The synthetic resin according to the invention is very particularly suitable as a grinding resin for the preparation of stable aqueous pigment pastes which can be used for pigmenting cathodic electrocoating finishes.

Regarding the components of such a pigment paste, which forms the subject of the present invention, the following may be stated specifically:

($\alpha$) Component ($\alpha$) is the novel synthetic resin, and is present in the pigment paste according to the invention in an amount of from 5 to 50, preferably from 10 to 30, % by weight.

($\beta$) Components ($\beta$) are organic, preferably inorganic, pigments and/or fillers, which are present in the novel pigment paste in amounts of from 20 to 65, preferably from 30 to 50, % by weight. Examples of preferred pigments and/or fillers are titanium dioxide, chromium oxide, chromates, iron oxides, molybdate pigments, barium sulfate, chalk, talc, kaolin, basic lead silicate and carbon black.

($\gamma$) Components ($\gamma$), which are present in the novel pigment paste in amounts of from 2 to 20, preferably from 5 to 15, % by weight, are organic solvents conventionally used in surface coating technology, such as those stated above. Preferred solvents of this type are the water-miscible solvents, in particular methoxypropanol and butylglycol.

($\delta$) Component ($\delta$) is water. It is present in the novel pigment paste in an amount of from 28 to 55, preferably from 35 to 45, % by weight. The sum of the percentages stated under ($\alpha$), ($\beta$), ($\gamma$) and ($\delta$) is 100.

($\epsilon$) The pigment paste according to the invention may furthermore contain as much as 5% by weight, based on the sum of components ($\alpha$) to ($\delta$), of a component ($\epsilon$). These are assistahts conventionally employed in surface coating technology, such as leveling agents, wetting agents, antifoams, dispersants, antisettling agents and curing catalysts. Suitable curing catalysts are tin compounds, e.g. dibutyl-tin dilaurate, dibutyl-tin oxide, tin acetate and the like. Lead and copper compounds, e.g. lead naphthenate, lead octoate, lead acetate and copper acetate, are also useful.

To prepare the novel pigment paste, for example, the component ($\beta$) is converted to a paste in a solution of the novel synthetic resin ($\alpha$) in ($\gamma$), for example with the aid of a dissolver, water ($\delta$) and, if required, ($\epsilon$) are added, and the mixture is then wet-milled by a method conventionally employed in surface coating technology. Milling units preferably used for this purpose are three-roll mills, ball mills, stirred mills, sand mills, etc. The pigments and/or fillers ($\beta$) contained after milling in the novel pigment paste generally have a particle size, according to DIN No. 53,203, of less than 15 $\mu$m.

The pigment paste according to the invention is used for pigmenting any desired cathodic electrocoating finishes (which do not form a subject of the present invention), for example systems based on epoxide/amine adducts, which are prepared either in a conventional manner from epoxy resins and amines or from epoxy resins and ketimines of primary diamines, as described in German Patent Application No. P 33 25 061.8, in combination with asymmetric urea crosslinking agents, as describd in German Patent Application Nos. P 33 11 514.1 and P 33 11 516.8. Electrocoating finishes based on OH-containing cationically modified base resins which are cured with $\beta$-hydroxy ester-containing crosslinking agents and are described in European Pat. No. 40,867, can also advantageously be pigmented with the pigment paste according to the invention.

Pigmenting is effected simply by stirring the novel pigment paste into the particular clear finish dispersion, which usually consists of the base resin, the crosslinking agent and water. The novel pigment paste is employed in general in an amount of from 2 to 45, preferably from 5 to 30, % by weight, based on the readyprepared electrocoating bath. The solids content of the electrocoating bath is generally brought to 5–30, preferably 10–25, % by weight by dilution with demineralized water. The bath pH is in general from 6.0 to 8.5, preferably from 6.5 to 7.5.

The baths may furthermore contain other conventional additives, such as leveling agents, wetting agents, surfactants, curing catalysts and additives for improving the corrosion protection, e.g. Cu(II) salts.

The novel electrocoating baths can be used for the cathodic electrocoating of any electrically conductive substrates, for example iron, aluminum, copper and the like, which may or may not be chemically pretreated, e.g. phosphatized.

The deposition voltages are in general from 50 to 400 V, preferably from 150 to 350 V, deposition being effected in general at from 15° to 40° C. in the course of from 1 to 3 minutes. The film deposited cathodically on the electrically conductive article is washed and then cured at from 120° to 200° C. for from 10 to 30 minutes. The resulting coating possesses excellent mechanical properties, such as great hardness and scratchresistance coupled with good flexibility and firm adhesion to the substrate.

The coatings obtained are also highly resistant to solvents and resistant in the salt spray test and possess good throwing power.

The Examples which follow illustrate the subject of the present invention without restricting it. Parts and percentages are by weight, unless stated otherwise.

EXAMPLE 1

Preparation of the low molecular weight quaternary ammonium salt ($A_1$):

311.5 parts of N,N-dimethylethylenediamine are dissolved in 571 parts of methyl isobutyl ketone. About 65 parts of water are separated off at from 120° to 150° C. in the course of 6 hours. The amine equivalent weight of the resulting approximately 75% strength solution of the ketimine in methyl isobutyl ketone is determined as 113 g by titration.

226 parts of this ketimine solution are neutralized with 60 parts of 100% strength acetic acid, and 74 parts of glycidol are added. After reaction for 2 hours at 100° C., epoxide is no longer detectable. Hydrolysis is then carried out with 90 parts of water for 1 hour at 80° C. The resulting solution of the quaternary ammonium salt in methyl isobutyl ketone/water is about 49% strength. It tends to form two phases but can be subjected directly to the subsequent reaction if shaken thoroughly.

Preparation of the synthetic resin containing quaternary ammonium groups:

425 parts of a commercial polyadduct of 2,2-bis(4-hydroxyphenyl)-propane and its diglycidyl ether, having an epoxide equivalent weight of about 1,700 g, are dissolved in 225 parts of butylglycol, and 112.5 parts of the approximately 49% strength, two-phase quaternary ammonium salt solution ($A_1$) are added. The mixture is reacted for about 3 hours at 60° C., after which virtually no epoxide can be detected. The resin is diluted to a solids content of about 55% with butylglycol. Preparation of the pigment paste:

330 parts of the synthetic resin containing quaternary ammonium groups, 330 parts of rutile, 180 part of kaolin, 30 parts of basic lead silicate, 15 parts of carbon black, 614 parts of water and 4,500 parts of glass beads (diameter 2 mm) are stirred for about 45 minutes at a speed of 1000 rpm in a stirred ball mill. After the glass beads have been separated off, a gray paste having a solids content of 51% is obtained.

EXAMPLE 2

Preparation of the low molecular weight quaternary ammonium salt ($A_2$)

1,444 parts of N,N-dimethylpropylenediamine are dissolved in 2,284 parts of methyl isobutyl ketone. About 260 parts of water are separated off at from 120° to 150° C. in the course of 6 hours. The amine equivalent weight of the resulting, approximately 75% strength solution of the ketimine in methyl isobutyl ketone is determined as 124 g by titration.

670 parts of this ketimine solution are neutralized with 162 parts of 100% strength acetic acid, and 194 parts of butylene oxide are added. After a reaction time of 90 minutes at from 82° to 100° C., epoxide is no longer detectable. The mixture is then hydrolyzed with 243 parts of water for 1 hour at 80° C. The resulting solution of the quaternary ammonium salt in methyl isobutyl ketone/water is about 50% strength and tends to form two phases. Preparation of the synthetic resin containing quaternary ammonium groups:

1,615 parts of the epoxy resin stated in Example 1 are dissolved in 855 parts of butylglycol, and 446.5 parts of the approximately 50% strength two-phase quaternary ammonium salt solution ($A_2$), which has been thoroughly mixed, are added. The mixture is reacted for about 3 hours at 60° C., after which epoxide is no longer detectable. The resin is diluted to a solids content of about 55% with butylglycol. Preparation of the pigment paste:

A 51% strength aqueous gray paste is prepared as described in Example 1, using this synthetic resin containing quaternary ammonium groups, instead of the corresponding resin from Example 1.

EXAMPLE 3

Preparation of the low molecular weight quaternary ammonium salt ($A_3$)

An approximately 75% strength ketimine solution having an amine equivalent weight of 124 g is prepared as described in Example 2. 670 parts of this solution are neutralized with 162 parts of 100% strength acetic acid, and 388 parts of butylene oxide are added. After a reaction time of 90 minutes at from 82° to 100° C., epoxide is no longer detectable. The mixture is then hydrolyzed with 243 parts of water for 1 hour at 80° C. The resulting solution of the quaternary ammonium salt in methyl isobutyl ketone/water is about 57% strength and, as in the preceding examples, tends to form two phases. Preparation of the synthetic resin containing quaternary ammonium groups:

1,615 parts of the epoxy resin stated in Example 1 are dissolved in 855 parts of butylglycol, and 512 parts of the approximately 57% strength two-phase quaternary ammonium salt solution ($A_3$), which has been thoroughly mixed, are added. The mixture is reacted for about 3 hours at 60° C., after which epoxide is no longer detectable. The resin is diluted to a solids content of about 55% with butylglycol. Preparation of the pigment paste A 51% strength aqueous gray paste is prepared as described in Example 1, using this synthetic resin containing quaternary ammonium groups, instead of the corresponding resin from Example 1.

EXAMPLE 4

Example 4 demonstrates the novel preparation process for the case in which the hydrolytic cleavage of the ketimine intermediate is dispensed with.

Preparation of the low molecular weight ketiminized quaternary ammonium salt ($A_4$)

A low molecular weight quaternary ammonium compound ($A_4$) is prepared as described in Example 2, the procedure being continued until the epoxide value of the added butylene oxide has fallen to 0. Hydrolysis is not carried out. An approximately 84% strength homogeneous solution of a low molecular weight quaternary ammonium salt in methyl isobutyl ketone is obtained, the additional primary amino group of this salt being present in the form of a ketimine. Preparation of the synthetic resin containing quaternary ammonium groups: 1,615 parts of the epoxy resin stated in Example 1 are dissolved in 855 parts of butylglycol, and 358 parts of the approximately 84% strength ketiminized quaternary ammonium salt solution ($A_4$) are added. After reaction for about 3 hours at 60° C., epoxide is no longer detectable. The resin is diluted to a solids content of about 55% with butylglycol.

Preparation of the pigment paste:

A 51% strength aqueous gray paste is prepared as described in Example 1, using this synthetic resin containing quaternary ammonium groups, instead of the corresponding resin from Example 1.

Testing of the pigment pastes

EXAMPLE 5

Example 5 describes the use of the pigment pastes from Examples 1, 2, 3 and 4 for pigmenting a cathodic electrocoating system consisting of a base resin ($X_1$) and a crosslinking agent (Y).

(a) Preparation of the base resin ($X_1$)

1,455 parts of a commercial polyadduct of 2,2-bis-(4-hydroxyphenyl)-propane and its diglycidyl ether, having an epoxide equivalent weight of 485, are dissolved in xylene to give an 80% strength solution. 150 parts of diethanolamine are added at 60° C., and reacted for 15 minutes at this temperature. 990 parts of hexamethylenediamine are then added, a highly exothermic reaction taking place. When the reaction is complete, xylene and excess hexamethylenediamine are distilled off under reduced pressure at from 195° to 205° C. in the course of about 30 minutes. 70 parts of xylene and 290 parts of a dimeric fatty acid are then added, and water is separated off from the mixture in the course of 1 hour at from 190° to 220° C. The reaction product is diluted to a solids content of 70% with 100 parts of butylglycol and 700 parts of isobutanol. The resulting base resin ($X_1$) has an amine number of 77 mg of KOH/g.

(b) Preparation of the crosslinking agent (Y)

The crosslinking agent (Y) is identical to the component $B_3$ (=15% strength solution of a reaction product of equivalent amounts of hexamethylene diisocyanate, in isocyanurate form, and dibutylamine in dioxane) from German Patent Application No. P 33 11 516.8.

(c) Preparation of an unpigmented electrocoating finish 100 parts of base resin ($X_1$) from Example (5a) are mixed with 60 parts of crosslinking agent (Y) from Example (5b). After the addition of 2.3 parts of acetic acid, the stirred mixture is diluted a little at a time with water to a total weight of about 900 parts.

(d) Preparation and testing of the pigmented electrocoating finishes 100 parts of pigment paste from Examples 1, 2, 3 and 4 are added in each case to 900 parts of the clear finish bath from Example (5c). The baths are then stirred for 168 hours at 28° C. Surface coating films are then deposited in the course of 2 minutes at the voltage stated in Table 1 on zinc-phosphatized steel test panels which have been made the cathode, and the said films are baked for 20 minutes at 160° C. The resulting coatings possess leveling properties which are satisfactory in practice. Further properties of the coatings are shown in Table 1 below.

EXAMPLE 6

Example 6 describes the use of the pigment paste from Example 2 for pigmenting a cathodic electrocoating system consisting of a base resin ($X_2$) combined with the crosslinking agent (Y) from Example 5.

(a) Preparation of the base Resin ($X_2$)

The base resin ($X_2$) is identical to the binder described in Example 3 of German Patent Application No. P 33 25 061.8, and is obtained as follows:

48 parts of an aqueous phase are separated off with 80 parts of xylene in the course of 2 hours at 190° C. from 387 parts of hexamethylenediamine, 580 parts of a dimeric fatty acid and 97 parts of linseed oil fatty acid. 552 parts of methyl isobutyl ketone are added to 696 parts of the remaining condensate, and 44 parts of water are separated off. The diketimine solution thus obtained has an amine number of 122 mg of KOH/g and a solvent content of 30%.

258.7 parts of a diglycidyl ether obtained from bis-(4-hydroxyphenyl)-2,2-propane and epichlorohydrin and having an equivalent weight of 485 are dissolved in 65 parts of toluene, and the traces of water present are separated off. 214.4 parts of the ketimine solution described above and 17.5 parts of diethanolamine are added, and the mixture is heated to 120° C. After 2 hours, epoxide is no longer detectable. 83.5 parts of solvent are distilled off under reduced pressure, and are replaced with 16 parts of butylglycol and 120.5 parts of isobutanol. The product has a solids content of 70%, corresponding to 57.2% after hydrolytic elimination of methyl isobutyl ketone.

(b) Preparation of an unpigmented electrocoating finish 122 parts of base resin ($X_2$) from Example (6a) are mixed with 60 parts of crosslinking agent (Y) from Example (5b), and the mixture is treated further as described in Example (5c).

Preparation and testing of the pigmented electrocoating finish:

100 parts of pigment paste from Example 2 are added to 900 parts of the clear finish bath from Example (6b). All subsequent steps are carried out as described in Example (5d). The resulting coatings have leveling properties which are satisfactory in practice, their other properties being as follows:

| | |
|---|---|
| Deposition voltage | 280 V |
| Throwing power (Ford) [range in cm] | 21.3 |
| Acetone resistance(*) | 1–2 |
| Reverse impact: | 120 in × lb (= 1.38 m · kg) |
| Salt spray test according to ASTM, undermigration at the scratch after 500 hours | 0.6 mm |

(*)see footnote to Table 1

TABLE 1

Results of the paste tests according to Example 5 for 17 μm film thickness

| Coating bath containing pigment paste from Example | Deposition voltage [V] | Throwing power (Ford) [range in cm] | Acetone resistance(*) | Reverse impact | Salt spray test according to ASTM [undermigration at the scratch after 500 hours, in mm] |
|---|---|---|---|---|---|
| 1 | 230 | 21.4 | 1–2 | 100 in × lb (= 1.15 m · kg) | 0.5 |
| 2 | 220 | 22 | 1 | 140 in × lb (= 1.61 m · kg) | 0.5 |

TABLE 1-continued

| | | Results of the paste tests according to Example 5 for 17 μm film thickness | | | |
|---|---|---|---|---|---|
| Coating bath containing pigment paste from Example | Deposition voltage [V] | Throwing power (Ford) [range in cm] | Acetone resistance(*) | Reverse impact | Salt spray test according to ASTM [undermigration at the scratch after 500 hours, in mm] |
| 3 | 200 | 21.2 | 1–2 | 40 in × lb (= 0.46 m · kg) | 0.8 |
| 4 | 190 | 19 | 1 | 80 in × lb (= 0.92 m · kg) | 0.3 |

(*)Acetone resistance: Tested by rubbing up and down 50 times with a cotton wool ball impregnated with acetone
Rating 1 = not attacked

We claim:

1. A water-dilutable synthetic resin containing quaternary ammonium groups, which furthermore contains one or more basic secondary or tertiary amino groups or secondary and tertiary amino groups per quaternary ammonium group, and is an adduct of
    (A) a quaternary ammonium salt having a molecular weight of about 175–1200, which is prepared by reacting
        (a) an organic compound possessing two or more basic amino groups per molecule, one of which is a primary group and is protected as a ketimine by prior reaction with a ketone, and the remaining basic amino groups are tertiary groups with
        (b) from 15 to 100 mol %, based on the nitrogen atoms of component (a), of an organic or inorganic acid and
        (c) from 15 to 100 mol %, based on the nitrogen atoms of component (a), of one or more monoepoxide compounds, and, if required, eliminating the protective group hydrolytically, and
    (B) a resin which has a mean molecular weight $\overline{M}_w$ of from 300 to 6000 and contains on average from 1.5 to 3.0 epoxide groups per molecule, and, if necessary,
    (C) one or more monofunctional organic compounds whose functional group is capable of undergoing an addition reaction with an epoxide, with the exception of tertiary amines and their salts.

2. A synthetic resin as set forth in claim 1, wherein component (a) is a ketimine-protected primary/tertiary diamine of the formula (I)

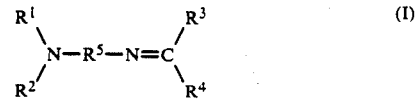

where $R^1$ and $R^2$ may be identical or different and are each straight-chain or branched alkyl of 1 to 4 carbon atoms, $R^3$ and $R^4$ may be identical or different and are each straight-chain or branched alkyl of 1 to 8 carbon atoms, or the carbon atoms bonded to $R^3$ and $R^4$ forms part of a 5-membered to 7-membered carbocyclic ring, and $R^5$ may be straight-chain or branched and is a divalent aliphatic or cycloaliphatic radical which may or may not contain heteroatoms, such as nitrogen, oxygen or sulfur.

3. A synthetic resin as set forth in claim 1, wherein the acid (b) is acetic acid or formic acid.

4. A synthetic resin as set forth in claim 2, wherein the acid (b) is acetic acid or formic acid.

5. A synthetic resin as set forth in claim 1, wherein the monoepoxide compound (c) is an epoxidation product of a straight-chain or branched aliphatic, cycloaliphatic or araliphatic olefin.

6. A synthetic resin as set forth in claim 1, wherein the material (B) containing epoxide groups is 2,2-bis-(4-hydroxyphenyl)-propanediglycidyl ether or is a polyadduct of 2,2-bis-(4-hydroxyphenyl)-propane and its diglycidyl ether, which polyadduct contains on average two epoxide groups per molecule and may be elastified by aliphatic segments.

* * * * *